United States Patent [19]

Ishikawa

[11] Patent Number: 5,572,767
[45] Date of Patent: Nov. 12, 1996

[54] GENERATOR SYSTEM FOR A VACUUM CLEANER

[75] Inventor: Masahiro Ishikawa, Kyoto, Japan

[73] Assignee: Yashima Electric Co., Ltd., Japan

[21] Appl. No.: 280,122

[22] Filed: Jul. 25, 1994

[30] Foreign Application Priority Data

Jul. 26, 1993 [JP] Japan .................................. 5-183749

[51] Int. Cl.⁶ ...................................................... A47L 9/28
[52] U.S. Cl. .................................................. 15/319; 15/339
[58] Field of Search .............................. 15/319, 339, 387, 15/412; 322/1, 2 R; 171/177; 137/57; 310/67 R

[56] References Cited

U.S. PATENT DOCUMENTS

| | | | |
|---|---|---|---|
| 3,011,925 | 12/1961 | Holtzclaw | 15/319 |
| 3,069,068 | 12/1962 | Hansen | 15/319 |
| 4,399,585 | 8/1983 | Kullik et al. | 15/319 |
| 4,514,874 | 5/1985 | Kurz | 15/339 |
| 5,033,151 | 7/1991 | Kraft et al. | 15/319 |
| 5,201,095 | 4/1993 | Choi | 15/319 |

FOREIGN PATENT DOCUMENTS

| | | | |
|---|---|---|---|
| 584743 | 3/1994 | European Pat. Off. . | |
| 120978 | 2/1948 | Germany | 15/319 |
| 2336758 | 3/1974 | Germany | 15/319 |
| 3225463 | 12/1984 | Germany | 15/319 |
| 2082351 | 3/1982 | United Kingdom . | |

*Primary Examiner*—David Scherbel
*Assistant Examiner*—Tony G. Soohoo
*Attorney, Agent, or Firm*—Beveridge, DeGrandi, Weilacher & Young, L.L.P.

[57] ABSTRACT

A vacuum cleaner includes a controlling valve in a ventilating path to a runner of an electric generator which rotates respondingly to a suction force, a rotating angle of the controlling valve is varied corresponding to an increase of the suction force so that an increase of the air flow across the runner is suppressed, thus an increase of a voltage generated by the electric generator is suppressed.

16 Claims, 4 Drawing Sheets

5,572,767

GENERATOR SYSTEM FOR A VACUUM CLEANER

BACKGROUND OF THE INVENTION

The present invention relates to a vacuum cleaner. More particularly, the present invention relates to a vacuum cleaner which has an electric generator within.

RELATED ART

A vacuum cleaner, which is well known from the past years, comprises a main body case 1, a suction hose section 2 and a suction nozzle section 3, as is illustrated in FIG. 5. The main body case 1 has a motor 4, a fan 5, a filter 6, a dust bag 7, motor controlling circuitry 8 and the like within. The suction hose section 2 comprises a hose 9 and an extention pipe 10. An operating section 11 is provided in a central portion of the suction hose section 2. As one species of vacuum cleaner among vacuum cleaners of such kind, there exists a vacuum cleaner having an electric generator which generates a voltage corresponding to a suction quantity for sucking dust, which vacuum cleaner is developed by the inventor and others. The electric generator is housed within the opertating section 11, as is illustrated in FIG. 6, for example. In FIG. 6, when the outside air is sucked through a suction opening 13 by a sucking pressure, a turbine runner 14 is rotated by the sucked air so that the electric generator 12 rotates and generates a voltage. The voltage is supplied as power voltage to a dust sensor circuitry section 17 which includes a light emitting device 15, a light receiving device 16, and the like.

But the sucking vacuum pressure of household vacuum cleaners varies widely such as about from −40 to 3000 mmAq. Therefore, the rotating speed of the turbine runner 14 varies greatly such as about from 4000 to 70000 r.p.m. (rounds per minute). Though the electric generator 12 is directly coupled to the turbine runner 14, the electric generator 12 rotates in correspondence to the great variation of the rotating speed so that the generated voltage varies within an extent from several volts to several tens of volts. Therefore, the generated voltage requires stabilization because the generated voltage is used as the power voltage for various controlling circuitries such as the dust sensor circuitry section 7 and the like. Though various electric circuit are employed for stabilizing the voltage, a disadvantage arises in that each eleciric circuit requires many electronic parts causing waste such as generation of heat and the like. Further, a disadvantage arises in that excessively high rotation is improper for the turbine and the electric generator in view of the durability of the bearing arrangement.

The present invention was made in view of the problems above-mentioned.

It is an object of the present invention to stabilize a generated voltage of an electric generator housed in a vacuum cleaner, with a simple arrangement and without employing electric circuitry.

SUMMARY OF THE INVENTION

A vacuum cleaner according to the present invention comprises a runner which rotates in correspondence to sucking force, and an electric generator which rotates and generates a voltage by a rotating force of the runner. The vacuum cleaner has a passing though quantity controlling valve which is provided in a passing path for the runner for adjusting a passing through quantity in correspondence to a sucking pressure.

In this specification, the word "runner" is used to express the runner, impeller and the like.

As to the vacuum cleaner, when a degree of vacuum caused by the sucking pressure is raised and thereby a sucking quantity of outside air becomes great, so as to increase a rotating speed of the runner, the passing through quantity controlling valve moves to close the passing path following the increase of the rotating speed so that an increase of the sucking quantity is suppressed. Consequently, an increase in the speed of the rotating speed of the runner and the electric generator are also suppressed. On the contrary, when a degree of vacuum caused by the sucking pressure is lowered and thereby a sucking quantity of outside air becomes small, so as to decrease a rotating speed of the runner, the passing through quantity controlling valve moves to open the passing path following the decrease of the rotating speed so that decrease of the sucking quantity is suppressed. Consequently, a decrease in the rotating speed of the runner, and the electric generator are also suppressed. Therefore, the rotating speed of the runner, and the voltage generated by the electric generator are maintained to be nearly constant in spite of great variation of the sucking quantity.

BRIEF DESCRIPTION OF THE PREFERRED EMBODIMENT

Hereinafter, we explain the present invention in detail according to an embodiment.

Figure 1:
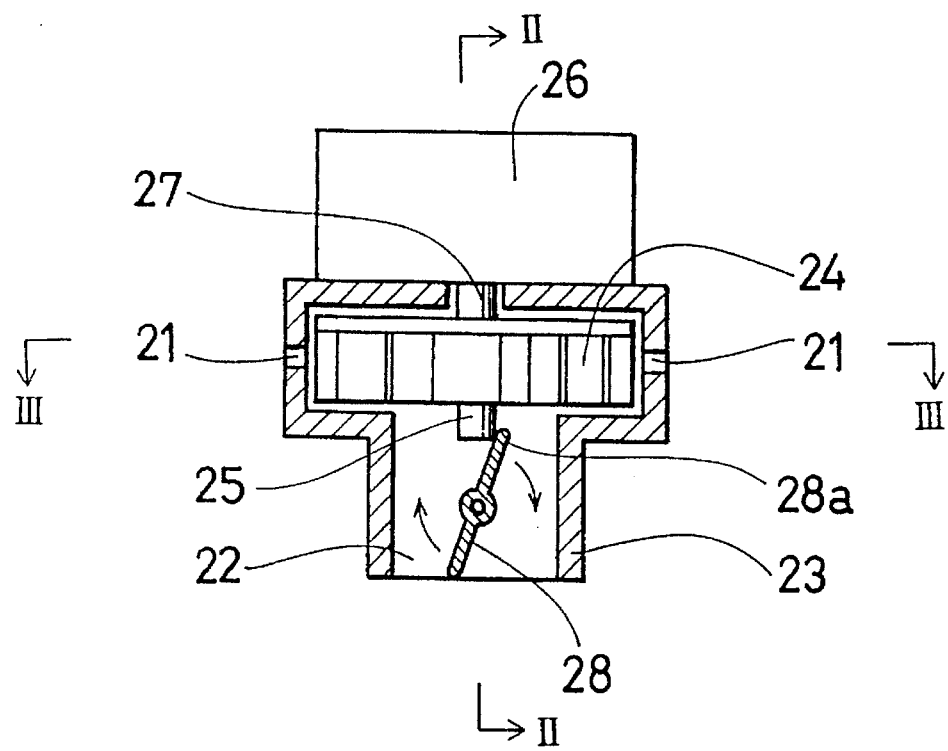
FIG. 1 is a cross sectional view illustrating a section including a turbine runner and an electric generator of an embodiment according to the present invention.
Figure 6:
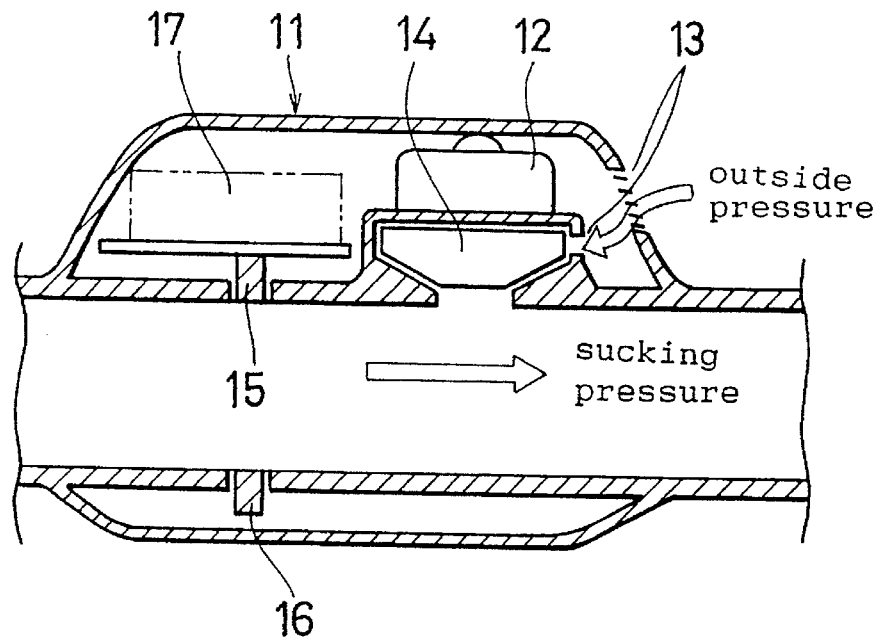
FIG. 6 is a vertical cross sectional view illustrating an operating section of the vacuum cleaner, as an example.

FIG. 1 is a cross sectional view illustrating a section including a turbine runner and an electric generator of an embodiment according to the present invention. In FIG. 1, a turbine runner 24 is provided within a pipe body 23 which includes a sucking opening 21 and an opening for a sucking pipe. A rotary shaft 25 of the turbine runner 24 is directly coupled to a rotary shaft 27 of an electric generator 26. This arrangement and the point that the arrangement is housed in an operating section, are nearly the same as the arrangement and the point illustrated in FIG. 6.

Figure 2:
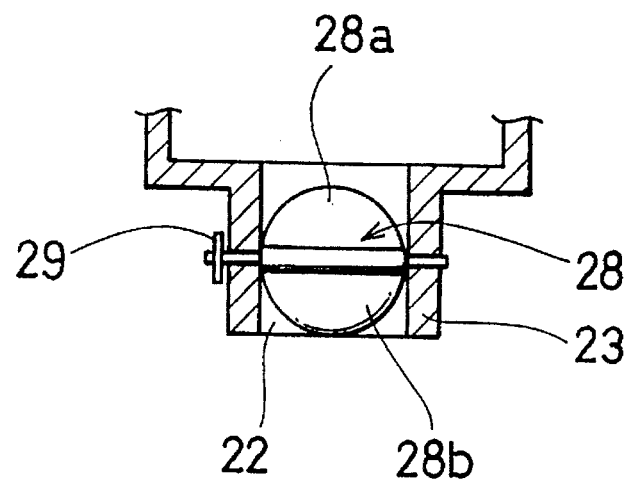
FIG. 2 is a cross sectional view of a main portion taken along a line II—II in FIG. 1.
Figure 3:
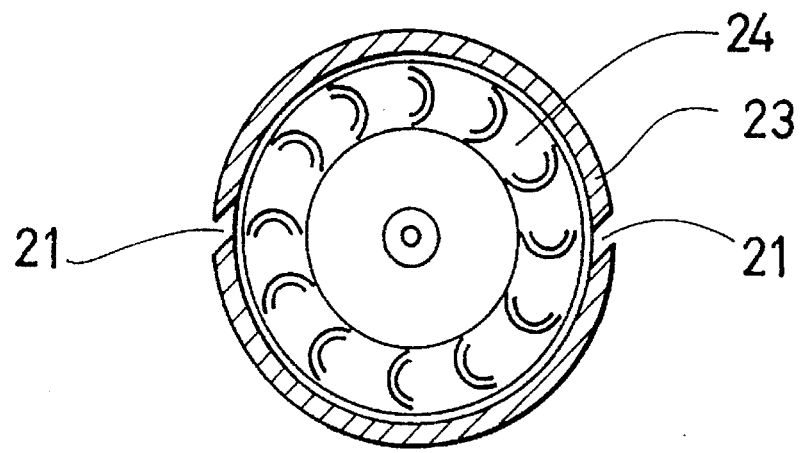
FIG. 3 is a cross sectional view taken along a line III—III in FIG. 1.
Figure 4:
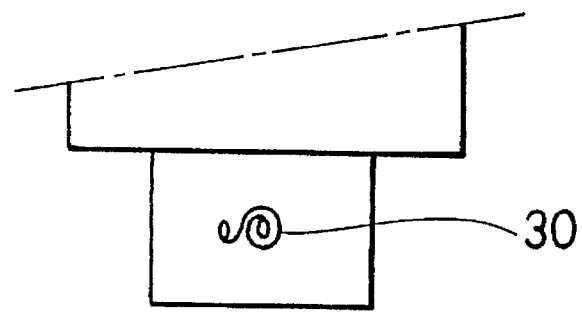
FIG. 4 is a side view of a main portion in FIG. 1, illustrating a valve returing spring.
Figure 5:
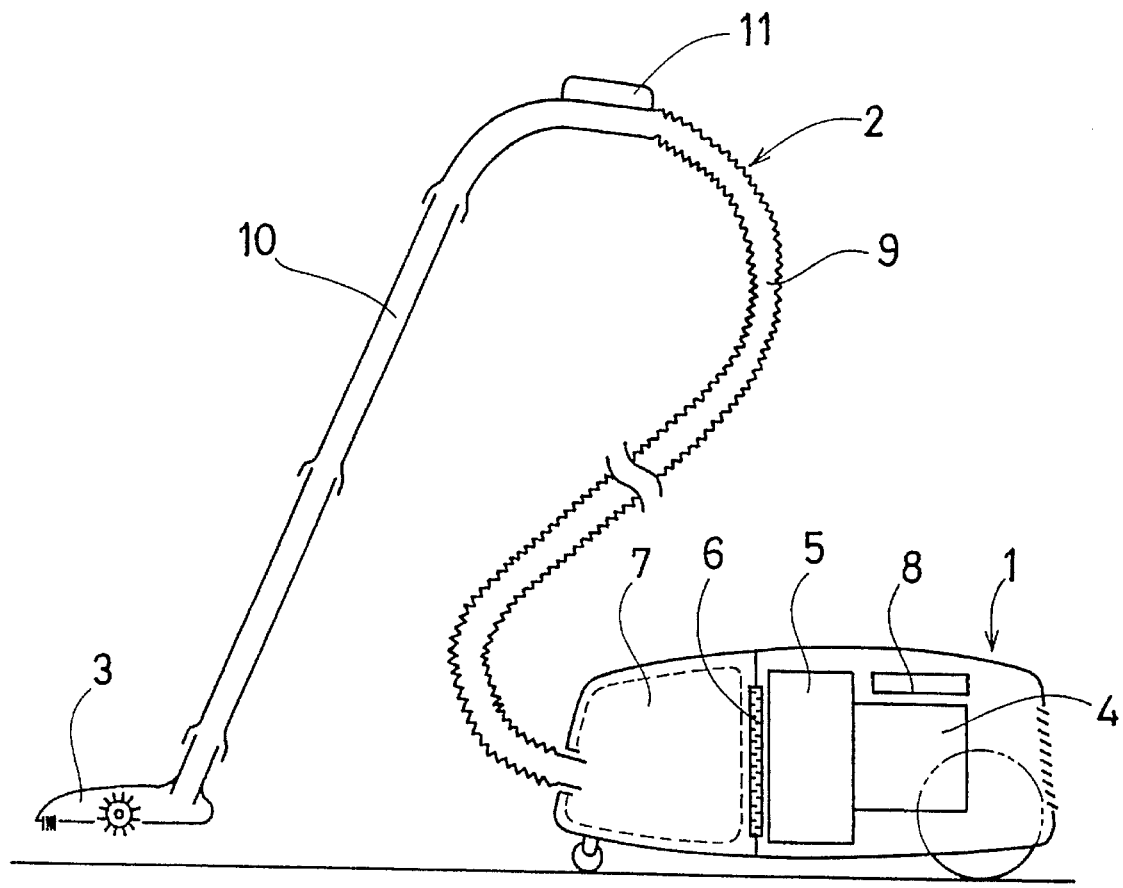
FIG. 5 is a schematic view illustrating an arrangement of a vacuum cleaner in its entirety.

A characteristic point of this embodiment is that a butterfly valve 28 is provided between the turbin runner 24 in the pipe body 23 which constitutes a sucking path and the opening 22 for the pipe body 23. This butterfly valve 28 has a slightly oval plate shape when it is seen from the front side thereof, as is illustrated in FIG. 2. And, the butterfly valve 28 is maintained to be inclined by about 30 degrees (the condition illustrated in FIG. 1) by a valve returning spring 30 which is provided to a valve shaft 29.

In this embodiment, when sucking begins, the air flows from the sucking opening 21, through the pipe body 23, and towards the opening 22. The turbine runner 24 is rotated by the force of the air flow, and the electric generator 26 is respondingly rotated so as to generate a voltage. When a quantity of the air flow is small, the butterfly valve 28 is inclined slightly from the vertical attitude. But, when the quantity of the air flow increases, a rotating force in a direction illustrated by an arrow is generated in the upper half wing (upper half valve plate) 28a of the butterfly valve 28 so that the butterfly valve 28 moves to close the horizontal attitude from the inclined attitude. Consequently, an effective opening area of the opening 22 decreases, an increase of the quantity of the air flow is disturbed. And, an increase of the rotating speed of the turbine runner 24 is disturbed to some degree. Also, an increase of the voltage generated by the electric generator 26 is disturbed to some degree.

When the degree of vacuum further increases, and the quantity of the air which is going to flow in the opening 22 develops a tendency to increase remarkably, the butterfly valve 28 receives a great air pressure. Therefore, the air pressure conquers the force of the valve returning spring 30, and the butterfly valve 28 further rotates in the direction illustrated by the arrow. The butterfly valve 28 stops its rotation in a condition that the butterfly valve has a nearly horizontal attitude because the air pressures acting on the butterfly valve 28 and the force of the valve returning spring 30 are balanced in such a condition. In this condition, the opening 22 becomes nearly closed for the effective area thereof so that the increase of the air passing through the opening 22 is remarkably limited and suppressed.

Consequently, the increase of the rotating speed of the turbine runner 24 is remarably suppressed. The increasing of the voltage generated by the electric generator 26 is remarkably suppressed as a natural result. Therefore, making the generated voltage to an almost constant voltage is performed, which is the initial object.

Figure 7:
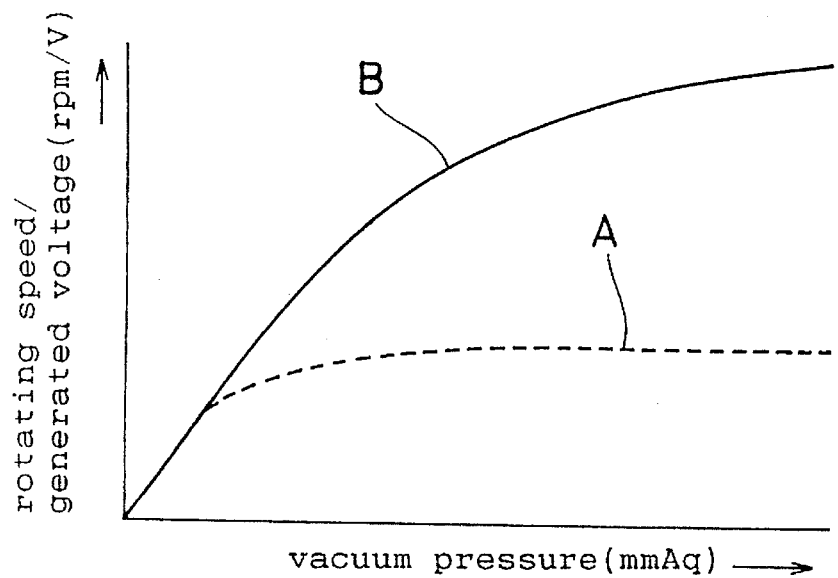
FIG. 7 is a chart illustrating relative characteristics of rotating speed/generated voltage, relative to variation of degree of vacuum in a case when a butterfly valve is employed and in a case when the butterfly valve is not employed.

Relative characteristics of the rotating speed/generated voltage to variation of vacuum pressure in a case when the butterfly valve 28 is employed (refer to A in a FIG. 7) and in case when the butterfly valve 28 is not employed (refer to B in FIG. 7), are illustrated in FIG. 7. A rather almost constant generated voltage is obtained in the case that the butterfly valve 28 is employed.

What is claimed is:

1. A vacuum cleaner comprising:

a suction hose section;

a motor for producing suction in the suction hose section;

a suction pipe defining an air passing path, a first opening at one end of the air passing path, and a second opening at an opposite end of the air passing such that the air passing path commmunicates with the suction hose section through the second opening, whereby suction produced in the suction hose section by the motor pulls air into the air passing path through the first opening, along the air passing path to the second opening, and out of the air passing path into the suction hose section through the second opening;

a rotatable runner provided in the air passing path, the runner being rotated by air flow along the air passing path;

an electric generator coupled to the runner such that the generator generates a voltage in response to rotation of the runner; and a control valve provided in the air passing path, the control valve being arranged to move to close the air passing path when the suction produced in the suction hose section by the motor increases beyond a predetermined suction, and to move to open the air passing path when the suction produced in the suction hose section by the motor decreases below the predetermined suction.

2. A vacuum cleaner in accordance with claim 1, where in the control valve is rotatable about a valve shaft, and the control valve is rotated to a predetermined angle of inclination relative to a direction of air flow in the air passing path when the suction produced in the suction hose section by the motor is the predetermined suction.

3. A vacuum cleaner in accordance with claim 2, wherein the control valve rotates to increase the angle of inclination of the control valve when the suction produced in the suction hose section by the motor increases beyond the predetermined suction, and rotates to decrease the angle of inclination of the control valve when the suction produced in the suction hose section by the motor decreases below the predetermined suction.

4. A vacuum cleaner in accordance with claim 2, wherein the control valve is a butterfly valve with valve plates extending from opposite sides of the valve shaft.

5. A vacuum cleaner in accordance with claim 2, wherein the control valve is maintained at the predetermined angle of inclination by a spring, when the suction produced in the suction hose section by the motor is the predetermined suction.

6. A vacuum cleaner in accordance with claim 5, wherein the spring is biased to rotate the control valve in response to variations in the suction produced in the suction hose section by the motor, so that the voltage generated by the generator remains substantially constant.

7. A vacuum cleaner in accordance with claim 1, wherein the control valve is located in the air passing path downstream from the runner.

8. A vacuum cleaner in accordance with claim 1, wherein the control valve controls air flow in the air passing path in response to variations in the suction produced in the suction hose section by the motor, so that the voltage generated by the generator remains substantially constant.

9. A generator system for use with a vacuum cleaner, comprising:

a suction pipe defining an air passing path, a first opening at one end of the air passing path, and a second opening at an opposite end of the air passing, whereby suction produced by the vacuum cleaner pulls air into the air passing path through the first opening, along the air passing path to the second opening, and out of the air passing path through the second opening;

a rotatable runner provided in the air passing path, the runner being rotated by air flow along the air passing path;

an electric generator coupled to the runner such that the generator generates a voltage in response to rotation of the runner; and a control valve provided in the air passing path, the control valve being arranged to move to close the air passing path when the suction produced by the vacuum cleaner increases beyond a predetermined suction, and to move to open the air passing path when the suction produced by the vacuum cleaner decreases below the predetermined suction.

10. A generator system in accordance with claim 9, wherein the control valve is located in the air passing path downstream from the runner.

11. A generator system in accordance with claim 9, wherein the control valve controls air flow in the air passing path in response to variations in the suction produced by the vacuum cleaner so that the voltage generated by the generator remains substantially constant.

12. A generator system in accordance with claim 9, wherein the control valve is rotatable about a valve shaft, and the control valve is rotated to a predetermined angle of inclination relative to a direction of air flow in the air passing path when the suction produced by the vacuum cleaner is the predetermined suction.

13. A generator system in accordance with claim 12, wherein the control valve rotates to increase the angle of inclination of the control valve when the suction produced by the vacuum cleaner increases beyond the predetermined suction, and rotates to decrease the angle of inclination of the control valve when the suction produced by the vacuum cleaner decreases below the predetermined suction.

14. A generator system in accordance with claim 12, wherein the control valve is maintained at the predetermined angle of inclination by a spring, when the suction produced by the vacuum cleaner is the predetermined suction.

15. A generator system in accordance with claim 14, wherein the spring is biased to rotate the control valve in response to variations in the suction produced by the vacuum cleaner so that the voltage generated by the generator remains substantially constant.

16. A generator system in accordance with claim 12, wherein the control valve is a butterfly valve with valve plates extending from opposite sides of the valve shaft.

* * * * *